Patented May 22, 1951

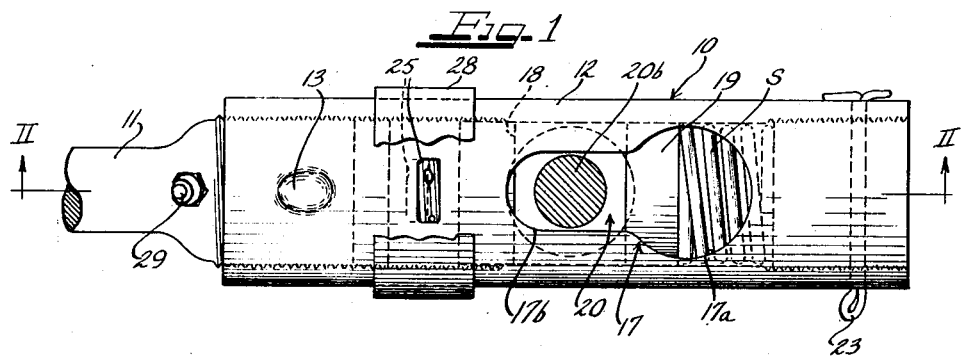
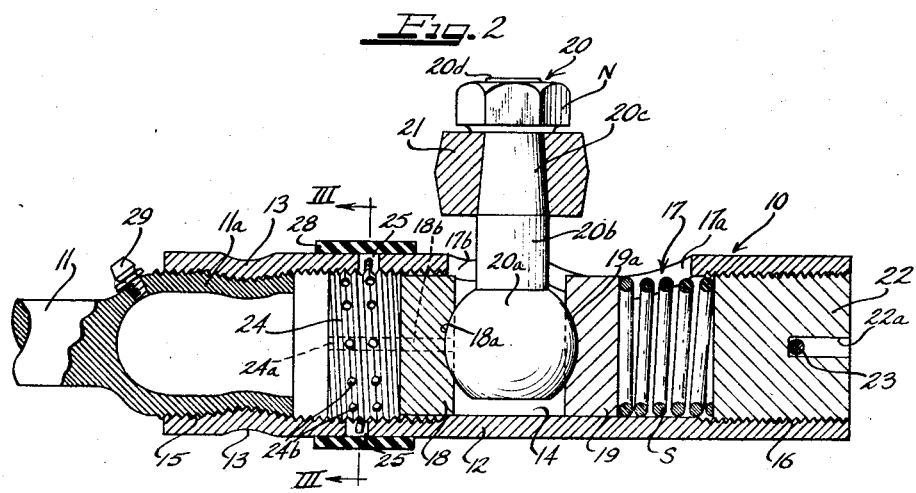
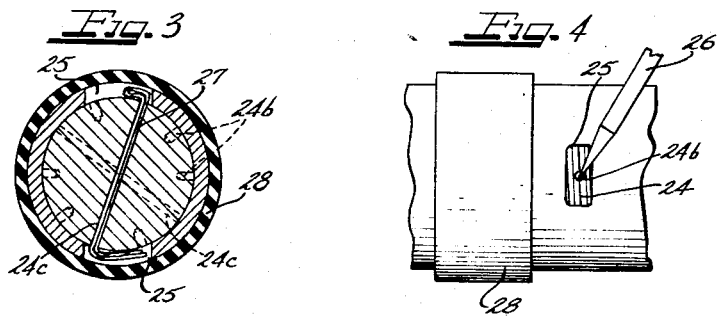
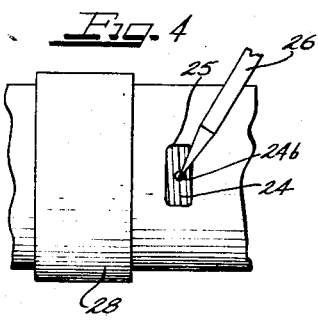

2,553,789

UNITED STATES PATENT OFFICE 2,553,789

ADJUSTABLE JOINT ASSEMBLY

Bernard E. Ricks, Ferndale, Mich., assignor to Thompson Products, Inc., Cleveland, Ohio, a corporation of Ohio Application July 21, 1949, Serial No. 105,959

6 Claims. (Cl. 287—90)

1

This invention relates to an adjustable assembly including shiftable bearings which are selectively controlled to position the operative center of the assembly without shifting the part housing the assembly. Particularly, the invention deals with a drag link end that is rendered adjustable by shifting parts within the end and thereby avoiding the heretofore necessary adjusting sleeves, clamps, and the like required for shifting the end itself.

The invention will hereinafter be specifically described as embodied in a drag link end for automotive steering assemblies, but it should be understood that the invention is adapted for general usage in adjusting bearings, joints, and the like for controlling the centers thereof without disturbing the housings for the parts.

In accordance with this invention, a hollow drag link end, formed either by upsetting a tubular end portion on one end of a solid rod or by locking a piece of tubing to the end of the solid rod, is equipped with conventional opposed bearing disks, a ball stud in bearing engagement with the disks, a wear take-up spring, and a closure plug. One of the bearing blocks, however, is backed up by a threaded plug which can be selectively rotated in the drag link end to vary the position of the bearing and thereby control the centerline for the stud. The threaded plug is rendered accessible for selective rotation in the drag link end by slots formed in the end to expose portions of the plug. The plug is equipped with fine holes which are drilled at spaced intervals in a helical path around the plug so that at least one hole will always be aligned with a slot in the drag link end. A pick inserted through the slot is then adapted to engage an exposed hole for rotating the plug if desired. Some of the holes may be drilled through the plug for receiving a cotter pin to lock the plug in adjusted position. The slots can then be sealed by a rubber sleeve or the like.

It is, then an object of this invention to provide an adjustable linkage including a selectively shiftable internal member which is accessible from outside of the housing of the linkage for varying the positions of the linkage parts without shifting the linkage housing.

Another object of the invention is to provide a drag link end with an adjustable thrust plug for varying the effective position for the drag link stud.

A still further object of the invention is to provide a linkage including a ball and socket

2 joint wherein the position of the ball stud is controlled as desired by a shiftable plug inside of the linkage.

Another object of the invention is to provide a drag link end or the like construction with an internal threaded plug which is selectively shifted from outside of the drag link end for controlling the positions of the parts inside of the drag link end.

Other and further objects of the invention will be apparent to those skilled in the art from the following detailed description of the annexed sheet of drawings which, by way of a preferred example only, illustrates one embodiment of the invention.

On the drawings:

Figure 1 is a fragmentary plan view of a drag link end according to this invention;

Figure 2 is a longitudinal cross-sectional view, with parts in elevation, taken along the line II—II of Figure 1;

Figure 3 is a transverse cross-sectional view, with a part in elevation, taken along the line III—III of Figure 2; and Figure 4 is a fragmentary plan view illustrating the manner in which the adjusting plug can be shifted from the outside of the drag link end.

As shown on the drawings:

In Figures 1 and 2 the drag link end 10 is composed of a solid drag link 11 having a hollow enlarged externally threaded end portion 11a receiving an internally threaded tube 12 in threaded relation thereon. The threaded together tube 12 and the hollow end portion 11a are staked by localized dimples 13 which deform the threads and prevent relative rotation of the parts to thereby produce an integral assembly.

The tube 12 has a plain, unthreaded, central portion 14 with internally threaded end portions 15 and 16. A part only of the threaded end portion 15 receives the rod end portion 11a so that an appreciable length of thread extends in the tube beyond the rod end 11a.

The unthreaded plain central portion of the tube 12 has a key-hole slot 17 through the side wall thereof including an enlarged circular portion 17a adjacent the threaded end 16 and a narrow longitudinally extending slot portion 17b communicating with the large portion 17a and terminating adjacent the outer end of the threaded portion 15.

Opposed bearing disks 18 and 19 are slidable in the plain central portion 14 of the tube and have concave fragmental spherical bearing walls 18a and 19a respectively in their adjacent faces. The disk 18 is centrally drilled to provide a passageway 18b therethrough communicating with the bearing wall 18a thereof.

A ball stud 20 has a ball end 20a adapted to be inserted through the key-hole portion 17a and a cylindrical shank portion 20b extending from the ball end adapted to project freely through the key-hole portion 17b. The ball end 20a is larger than the key-hole portion 17b and the stud cannot be retracted through this key-hole portion. The stud also has a tapered shank portion 20c extending from the cylindrical portion 20b and converging to a threaded cylindrical end portion 20d. The eye end 21 of a steering arm or the like link member is wedged on the tapered portion 20c of the stud by a nut N threaded on the threaded portion 20d of the stud.

The ball end 20a of the stud is received between the bearing disks 18 and 19 and is tiltable and rotatable on the bearing walls 18a and 19a thereof.

A spring S is held under compression between the bearing disk 19 and a plug 22 which is threaded into the end 16 of the tube. This plug has a slot 22a in its outer end adapted to receive a cotter pin 23 which projects through the tube for locking the plug in adjusted position in the tube. The compressed spring S urges the disk 19 against the ball stud 20a and the load of the spring is resisted by the disk 18.

In accordance with this invention, the longitudinal position of the disk 18 in the tube 12 is controlled by an adjusting plug 24 which is threaded in the portion 15 of the tube to abut the disk 18. This plug 24 has a central bore 24a therethrough aligned with the bore 18b in the disk and adapted to convey lubricant to the bore 18b.

The plug 24 has radial lined holes 24b drilled at spaced intervals therearound in a spiral path. Several of these holes are drilled completely through the plug to provide cotter pin receiving holes 24c.

The tube 12 has a pair of transverse slots 25 through the threaded portion 15 thereof which receives the plug 24. These slots 25 are diametrically opposed but longitudinally offset so that at least one hole 24b or 24c will always be exposed in a slot 25. As shown in Figure 4, a pick 26 can easily engage a hole 24b in a slot 25 to rotate the plug 24 until the hole is moved to an extremity of the slot whereupon another hole will be exposed either in the same slot or the opposed slot. The plug 24 is thereupon longitudinally shiftable in the threaded portion 15 of the tube without disassembly of any of the parts in the drag link 10. A cotter pin 27 is insertable through one of the holes 24c which is exposed to the slot 25 and the end of the cotter pin adapted to be flattened down in the slot so as not to appreciably extend beyond the periphery of the tube.

A rubber sleeve 28 on the tube 12 is provided to cover the slots 25 to protect the threads on the plug 24.

The rod end 11a has a lubricant fitting 29 threaded therein to supply lubricant to the interior of the tube for passage through the bores 24a and 18b into the central portion of the tube where the lubricant can be distributed to the ball end of the stud and to the bearing and can also lubricate the disks 18 and 19 for free sliding movement in the tube.

When it is desired to change the center of the ball stud 20 as for adjusting the relationship between the rod 11 and the arm 21, the spring load on the disks 18 and 19 is preferably released by removing the cotter pin 23 and unscrewing the plug 22 until the spring S is loose. The rubber seal 28 is then displaced on the tube 12 to expose the slot 25 and the pick 26 is then manipulated to rotate the plug 24 until the disk 18 is shifted to a position that will determine the desired center point for the ball stud. The adjustment can be made in either direction and when it is completed, the cotter pin 27 is replaced to lock the plug 24 in the tube. The plug 22 is then tightened against the spring S and the cotter pin 23 is replaced. The seal is then returned to its slot covering position and the adjusted joint is ready for use without shifting any of the housing members.

From the above descriptions it will be understood that this invention provides a linkage assembly wherein articulated parts are selectively positioned by shifting internal members without disturbing the positions of the housings for these members.

It will be understood that modifications and variations may be effected without departing from the scope of the novel concepts of this invention.

I claim as my invention:

1. A joint assembly comprising a housing, shiftable bearing elements in said housing, a joint member carried by said bearing elements and extending from said housing, a shiftable plug in said housing controlling the position of said joint parts in the housing, and means for locking said shiftable plug in fixed position in the housing, said housing having localized openings therethrough for exposing portions of said plug to the exterior of the housing to permit removal of said locking means and shifting of the plug whereby the position of the stud in the housing will be controlled from the outside of the housing without shifting the housing.

2. A drag link end or the like comprising an elongated tubular part, bearing blocks slidable in said tubular part, a ball stud member having a ball end disposed between said blocks in bearing engagement therewith and a shank extending through a side wall of the tubular part, adjustable abutment means for one of said bearing blocks, a spring thrusting against the other of said bearing blocks, an adjustable closure plug bottoming said spring in the end portion of the tubular part, and said tubular part having localized openings exposing portions of the adjustable abutment means and accommodating movement of a tool therein for shifting the abutment means to control the position of the ball stud in the tubular parts.

3. A drag link end construction comprising a drag link having a hollow tubular end with a key-hole slot in the side wall thereof, opposed bearing blocks slidable in said tubular end, a ball stud having a ball end carried by said bearing blocks and a shank extending freely through the key-hole slot, an adjusting plug threaded into the end of the tubular part, a spring compressed between said adjusting plug and one of said bearing blocks, an abutment plug threaded into the tubular part adjacent the other bearing block, and means operative from outside of the tubular part for shifting the abutment plug to control the position of the ball stud in the tubular part.

4. An adjustable drag link end or the like which comprises a rod having a hollow tubular end portion, internal threads in said end portion, a closure plug threaded into the end of said end portion, an adjustable abutment plug threaded into the end portion in spaced relation from the closure plug, spring pressed bearing means between said plugs, a ball stud carried by said bearing means, said tubular end portion having slots exposing a portion of the periphery of the abutment plug, said abutment plug having radially extending holes arranged in a spiral path to be successively exposed in said slots for receiving a tool inserted through the slots to rotate the plug and thereby shift the position thereof, and means for locking the plug in adjusted shifted position.

5. A drag link or the like construction comprising a rod having an enlarged externally threaded end portion, an internally threaded tube threaded on said end portion and projecting therefrom, a longitudinally shiftable ball and socket joint in said tube, an abutment plug for said joint threaded in said tube, said tube having a slot therein exposing a portion of the periphery of the plug whereby the plug can be rotated from outside of the tube to control the position of the ball joint in the tube without shifting the tube on the rod.

6. A drag link or the like construction comprising a link arm having a hollow tubular end portion, a ball and socket joint slidable in said tubular end portion, an adjustment plug threaded in said tubular end portion for controlling the position of said ball and socket joint in the tubular end part, said adjustment plug having a plurality of radially extending holes around the periphery thereof in a spiral path, opposed transverse slots in said tube exposing portions of the periphery of the adjustment plug to uncover at least one hole at a time, at least some of said holes accommodating a cotter pin for anchoring the plug against rotation, a cotter pin in one of said holes and projecting into said slots, and a sleeve on said tubular part covering said slots.

BERNARD E. RICKS.

REFERENCES CITED

The following references are of record in the file of this patent:

UNITED STATES PATENTS

| Number | Name | Date |
| --- | --- | --- |
| 1,337,138 | Kaps | Apr. 13, 1920 |
| 1,604,247 | Urschel | Oct. 26, 1926 |
| 1,619,291 | Crawford et al. | Mar. 1, 1927 |